July 26, 1932.  H. D. GEYER  1,869,141
COMPOSITE MOLDED ARTICLE AND METHOD OF MAKING SAME
Filed April 30, 1928
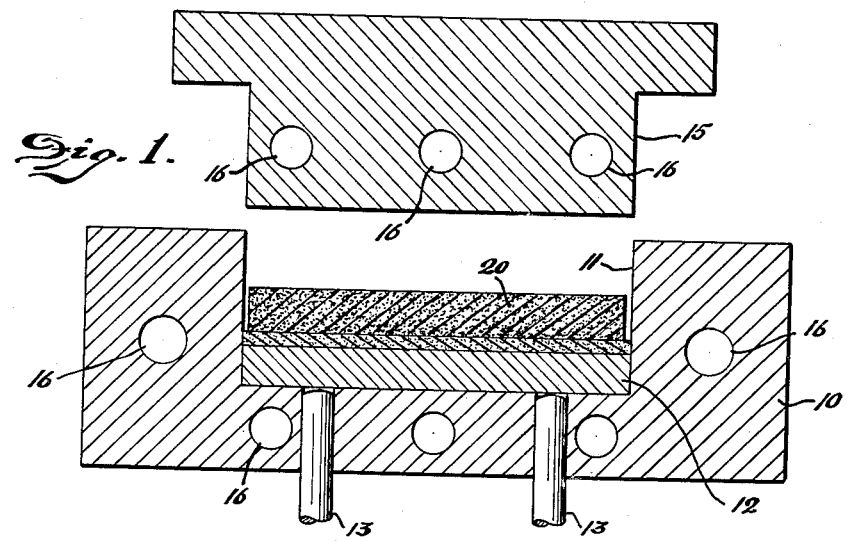
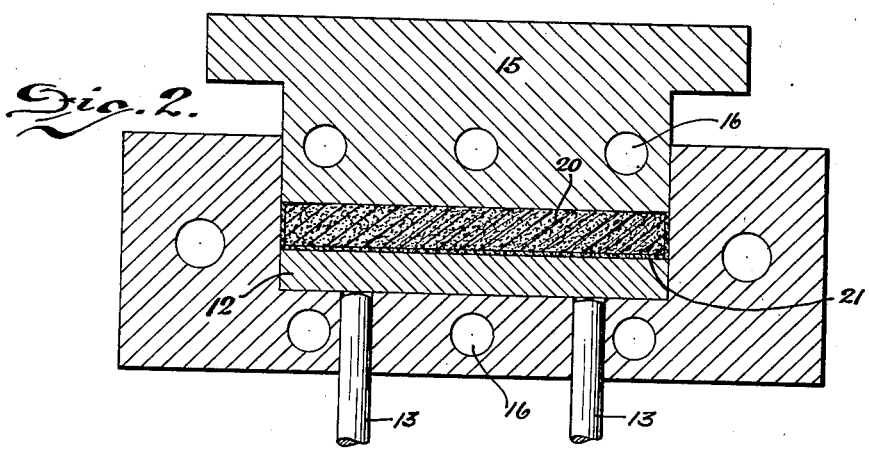
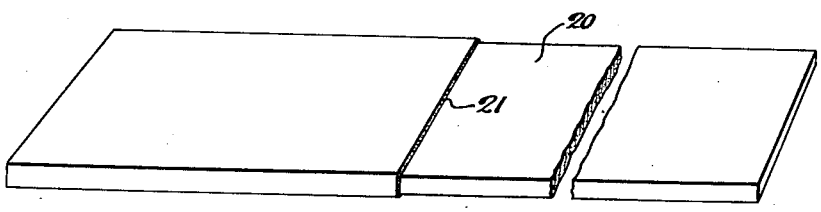

Patented July 26, 1932

1,869,141

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

COMPOSITE MOLDED ARTICLE AND METHOD OF MAKING SAME

Application filed April 30, 1928. Serial No. 274,049.

This invention relates to molded articles, especially such as molded panels, doors, strips, etc., which can be used for building up a molded cabinet such as a refrigerator cabinet.

An object of this invention is to provide an article having its main body portion molded from a strong relatively cheap material, while its exposed surface or surfaces are coated with a higher grade molded material for finish or decoration.

A more specific object is to provide such an article having its main body molded from a relatively cheap bituminous compound, while its finished surfaces are coated with an easily molded nitrocellulose compound which forms a fine appearing, smooth, hard surface thereupon which will not crack off the bituminous body portion.

Another object is to provide an improved method of molding such a composite article by first premolding the bituminous compound to slightly undersized dimensions and then finally molding such pre-molded body in contact with its surface layer of nitrocellulose compound under such heat and pressure as is required to properly mold said nitrocellulose compound and cause a firm bond with the bituminous body.

Further objects and advantages of the present invention will be apparent from the following description, reference being had to the accompanying drawing, wherein a preferred form of embodiment of the present invention is clearly shown.

In the drawing:

Fig. 1 is a transverse section thru the mold and illustrates the method of molding according to this invention of a door-way molding strip for refrigerator cabinet doors. The mold sections are shown open and the nitrocellulose compound distributed over the bottom of the mold cavity and the pre-molded bituminous compound laid thereupon, all ready for the final molding operation.

Fig. 2 illustrates the mold sections of Fig. 1 closed under hydraulic pressure and causing the nitrocellulose compound to flow up around the lateral surfaces of the pre-molded bituminous strip before it sets hard and becomes a hard bonded coating therefor.

Fig. 3 is a perspective view of the composite molded strip, showing the surface coating broken away at the right side of the figure.

Similar reference characters refer to similar parts thruout the drawing.

Numeral 10 designates the lower section of the closed type mold having the knock-out plate 12 in the bottom of the mold cavity 11 therein. A suitable number of knock-out pins 13 for plate 12 are provided over the longitudinal length of the mold to properly eject the plate 12 and the molded strip from the mold after the molding operation is completed. The movable top section 15 of the mold is shown in Fig. 1 about to enter the mold cavity 11 and be forced against the moldable material therein under the desired high pressure. The mold sections 10 and 15 preferably have passages 16 therein thru which water or steam is circulated for heating or cooling the molds to the desired temperature at any time.

In carrying out this invention the bituminous material used for the pre-molded main body portion 20 of the strip is preferably chiefly composed of gilsonite, mineral rubber of lower melting point, disintegrated asbestos or other fiber, and an inert filler such as kieselguhr, fine clay, or powdered slate. This composition and the processes of mixing and molding the same is described and claimed in my copending application Serial No. 169,669, filed February 19, 1927. The moldable nitrocellulose material used for the finish coating 21 is preferably a cellulose nitrate dry powder compound moldable under a pressure of 500 pounds per square inch or less at a temperature around 200° F. This material is similar to pyroxylin or celluloid but is not so inflammable as these, has no odor, and hardens quickly in a mold upon cooling.

In carrying out this invention, the cellulose nitrate powder is fairly evenly distributed over the bottom of the mold cavity 11 to the desired thickness, after which the pre-molded bituminous strip 20 is laid within the cavity 11 directly upon the cellulose nitrate powder. The upper mold section 15 is now moved down upon the material within cavity 11 and forced thereupon by hydraulic pressure to give the desired molding pressure upon the cellulose nitrate material. A molding pressure of between 300 to 500 pounds per square inch has been found to give satisfactory results at a temperature of 200° F. Under such pressure and temperature the cellulose nitrate material will at first flow up around the edges of the bituminous panel 20 where it is spaced slightly from the cavity walls and so form a coating for said lateral edges of the panel, and will then set and form a hard, smooth, finish coating thereupon which will be firmly bonded to the bituminous material to such an extent that there is no danger of its ever cracking off. The molding pressure preferably remains on from 2 to 5 minutes, after which the mold is cooled to set the material and the finished panel is removed from the mold. It is to be noted that the temperature and pressure used in molding the cellulose nitrate material is relatively low compared to that ordinarily used in pre-molding the bituminous body 20, as described in the above mentioned prior application. Hence the body 20 will retain its proper form during the molding of the cellulose nitrate thereupon and there will be no objectionable interflowing of the bituminous material into the cellulose nitrate material such as would destroy the continuity of the cellulose nitrate coating.

This cellulose nitrate material can be produced in white or in various colors, while bituminous material can be produced only in black, or possibly, a very dark color. Hence by this invention bituminous panels, doors, molding strips, etc., for refrigerator cabinets can be easily, quickly, and economically produced in white or any desired light color, the cellulose nitrate material forming the fine appearing surface coating, while the bituminous material serves as the tough strength-giving body.

In molding articles of relatively large size, such for instance as one-piece refrigerator cabinets, ice cream cabinets, water cooler, or ice-maker cabinets, or large doors or panels for making such cabinets, the cellulose nitrate material is preferably made up into a sticky or paste form to permit its proper adherence to various surfaces on the pre-molded bituminous body and so hold it in place thereupon for the final molding operation. Such a cellulose nitrate paste may be applied to all the surfaces on the bituminous body desired to be finish coated therewith in any suitable manner, such as by blowing it on with an air brush, after which the coated article is finally molded under heat and pressure for a relatively short time, as described hereinabove. Any desired shape of article may be molded by the above method and the cellulose nitrate coatings may be provided with relief or embossed decorations molded therein by suitable die molds.

While the form of embodiment of the present invention as herein disclosed, constitutes a preferred form, it is to be understood that other forms might be adopted, all coming within the scope of the claims which follow.

What is claimed is as follows:

1. As an article of manufacture, a composite molded panel comprising: a premolded panel of fibrous bituminous compound having a relatively thin decorative finish coating of moldable nitrocellulose powder compound bonded thereto.

2. As an article of manufacture, a composite molded panel comprising: a base panel of a fibrous bituminous compound, and a relatively thin decorative coating of a moldable nitrocellulose powder compound which has the characteristic of firmly bonding to said bituminous panel during molding.

3. As an article of manufacture, a composite molded panel comprising: a base panel of a relatively strong fibrous bituminous compound, and a decorative coating of a moldable cellulose compound firmly bonded thereupon.

4. As an article of manufacture, a composite panel comprising: a base panel of relatively strong bituminous compound, and a relatively brittle decorative coating thereupon of a cellulose compound, said decorative coating having relief decorations in its surface which do not extend into said base panel, whereby said base panel is not weakened by said relief decorations.

In testimony whereof I hereto affix my signature.

HARVEY D. GEYER.